J. Dingee,
Milk Cooler.

No. 93,424. Patented Aug. 10, 1869.

Witnesses:
Geo. N. Mabee
Jno. F. Brooks

Inventor:
J. Dingee
per Munn & Co
Attorneys.

United States Patent Office.

JACOB DINGEE, OF DOWNINGTON, PENNSYLVANIA.

Letters Patent No. 93,424, dated August 10, 1869.

IMPROVEMENT IN MILK-COOLERS.

The Schedule referred to in these Letters Patent and making part of the same.

*To all whom it may concern:*

Be it known that I, JACOB DINGEE, of Downington, in the county of Chester, and State of Pennsylvania, have invented a new and improved Milk-Cooler; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
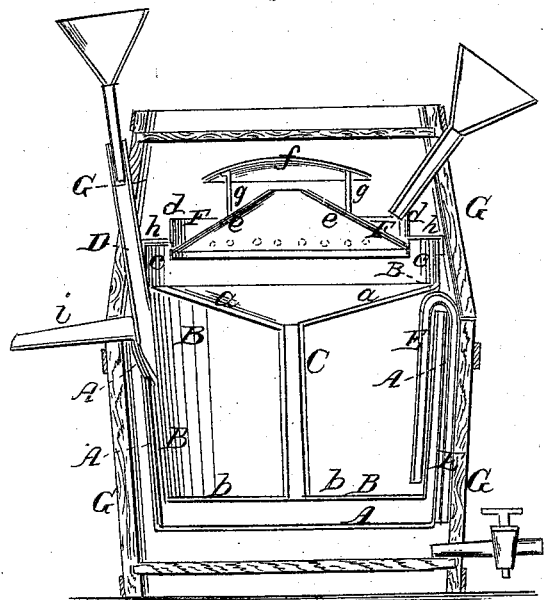
Figure 1 represents a vertical central section of my improved milk-cooler.
Figure 2:
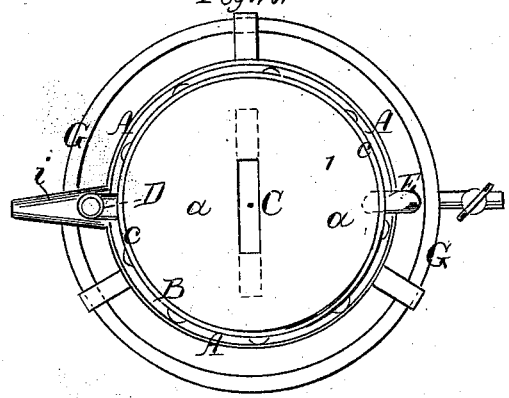
Figure 2 is a plan or top view of the same.

This invention relates to a new milk-cooler, which is so arranged that the steam produced during the cooling-process will be allowed to escape, and that the process itself will be rapid and thorough. One great object to be attained in milk-coolers, is facility of cleaning. Those now in use are mostly provided with curved or other passages, which are difficult to clean.

My invention consists in the general combination of vessels, pipes, &c., whereby an apparatus having all the requisites of a good milk-cooler is produced.

A, in the drawing, represents a tub or vessel, made of wood, sheet-metal, or other suitable material, of slightly-inverted conical form.

B is another vessel, of similar shape, but somewhat smaller than A, so that it can be fitted into the same, as shown.

When the vessel B is fitted into A, a space is left below and around A, as shown.

The vessel B is provided with a fixed covering-plate, *a*, which is deeper in the centre than toward the edges, as shown in fig. 1.

A vertical pipe, C, of oblong cross-section, is fitted through the vessel B, and through the cover *a* and bottom *b*, of the same, as shown, it being somewhat wider at its lower than at its upper end.

A vertical flange, *c*, projects around the top of the vessel B, as shown.

D is a pipe, leading from above into the vessel B, and

E is a siphon, extending into the vessel B, and made to project over the edge of A, as shown.

F is the distributing-vessel. It is composed of a perforated rim, *d*, conical bottom, *e*, and of a convex plate, *f*, which is, by legs *g*, supported above the centre of the bottom, as shown.

The vessel F is placed upon the vessel B, being, by hooks *h*, suspended from the rim *c* of the same.

The milk to be cooled is poured upon the plate *f*, runs into the vessel F; and, through the apertures of *d*, upon the cover of the vessel B. It thence flows, through the pipe C, into *a*, and rises in A, until it flows out through a spout, *i*.

The water is, through the pipe D, poured into the vessel B.

As the milk is, in thin sheets, brought in contact with the top, inside, bottom, and outside of the vessel B, it is thoroughly cooled before it escapes.

The bottom, *e*, has a central aperture, to allow the vapors from the milk to escape.

The siphon serves to withdraw the water from the vessel B.

It will be noticed that all the milk-passages can be easily reached and cleaned.

The whole device may be enclosed in a tub or case, G, as shown.

Having thus described my invention,

I claim as new, and desire to secure by Letters Patent—

A milk-cooler, consisting of the vessels A, B, and F, the vessel B, having the vertical pipe C, the inverted conical cover *a*, and the supply-pipe D, while the vessel F is perforated near the rim, all substantially as and for the purpose herein shown and described.

The above specification of my invention signed by me, this 10th day of June, 1869.

JACOB DINGEE.

Witnesses:
J. BROOKE SITER,
I. T. GREEN.